(12) United States Patent
Chen et al.

(10) Patent No.: US 11,947,481 B2
(45) Date of Patent: Apr. 2, 2024

(54) TERMINAL AND TYPE C INTERFACE ANTI-CORROSION METHOD

(71) Applicant: Honor Device Co., Ltd., Shenzhen (CN)

(72) Inventors: Jianli Chen, Shenzhen (CN); Chenlong Li, Shenzhen (CN); Yupeng Qiu, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 79 days.

(21) Appl. No.: 17/261,961

(22) PCT Filed: Jul. 24, 2018

(86) PCT No.: PCT/CN2018/096893
§ 371 (c)(1),
(2) Date: Jan. 21, 2021

(87) PCT Pub. No.: WO2020/019170
PCT Pub. Date: Jan. 30, 2020

(65) Prior Publication Data
US 2021/0294766 A1 Sep. 23, 2021

(51) Int. Cl.
G06F 13/38 (2006.01)
G06F 13/40 (2006.01)
G06F 13/42 (2006.01)

(52) U.S. Cl.
CPC ........ *G06F 13/385* (2013.01); *G06F 13/4022* (2013.01); *G06F 13/4081* (2013.01); *G06F 13/4282* (2013.01); *G06F 2213/0042* (2013.01)

(58) Field of Classification Search
CPC .............................................. G06F 2213/0042
See application file for complete search history.

(56) References Cited

U.S. PATENT DOCUMENTS 9,400,546 B1 7/2016 Agarwal et al.
10,014,637 B2 7/2018 Hasegawa et al.
(Continued)

FOREIGN PATENT DOCUMENTS

CN 105954644 A 9/2016
CN 106021161 A 10/2016
(Continued)

OTHER PUBLICATIONS

S. E. Liu etc., "Type-C Interface Reliability Concern of Electrical Overstress and Design for Mitigation,"; 2017 IEEE International Reliability Physics Symposium (IRPS); pp. 3A-5.1-3A-5.4.
(Continued)

*Primary Examiner* — Henry Tsai
*Assistant Examiner* — Aurangzeb Hassan
(74) *Attorney, Agent, or Firm* — RIMON PC

(57) ABSTRACT

The application discloses a terminal and a Type C interface anti-corrosion method. In the terminal, a processor is separately connected to a motion sensor and an interface chip. The interface chip is separately connected to the processor and a CC pin in a first Type C interface. The motion sensor is configured to monitor a motion status of the terminal, and the processor is configured to control, according to the motion status of the terminal, the interface chip to configure the CC pin of the first Type C interface to be in a low-level mode when it is determined that the motion status of the terminal changes from a moving state to a static state. When the motion status of the terminal changes from the moving state to the static state, the change in the motion status of the terminal is that the terminal is disconnected from an external device.

18 Claims, 10 Drawing Sheets

(56) References Cited

U.S. PATENT DOCUMENTS

| | | | |
|---|---|---|---|
| 10,261,557 B2 | 4/2019 | Kim | |
| 10,438,559 B2 | 10/2019 | Lim et al. | |
| 2014/0013012 A1* | 1/2014 | Terlizzi | G06F 13/38 |
| | | | 710/15 |
| 2016/0342492 A1* | 11/2016 | Chen | G06F 13/385 |
| 2017/0010126 A1* | 1/2017 | Han | G01C 21/165 |
| 2017/0110835 A1* | 4/2017 | Hasegawa | G06F 13/4081 |
| 2017/0177530 A1 | 6/2017 | Lei et al. | |
| 2017/0358922 A1 | 12/2017 | Bacon et al. | |
| 2018/0062325 A1 | 3/2018 | Kim et al. | |
| 2018/0081326 A1 | 3/2018 | Degura et al. | |
| 2018/0181177 A1 | 6/2018 | Fukute | |
| 2018/0181509 A1* | 6/2018 | Jo | G06F 13/4282 |
| 2019/0011386 A1* | 1/2019 | Park | G01N 27/048 |
| 2019/0129872 A1* | 5/2019 | Xu | G06F 13/4068 |
| 2020/0235563 A1* | 7/2020 | Zhu | H04L 12/40045 |
| 2020/0311010 A1* | 10/2020 | Wen | G06F 13/4282 |
| 2021/0096660 A1* | 4/2021 | Xie | G06F 3/0346 |
| 2021/0144335 A1* | 5/2021 | Pang | G09G 3/2092 |

FOREIGN PATENT DOCUMENTS

| | | |
|---|---|---|
| CN | 106648857 A | 5/2017 |
| CN | 106897239 A | 6/2017 |
| CN | 107038138 A | 8/2017 |
| CN | 107742912 A | 2/2018 |
| CN | 207353874 U | 5/2018 |
| CN | 108268089 A | 7/2018 |
| CN | 108268091 A | 7/2018 |
| CN | 108268389 A | 7/2018 |
| CN | 108268403 A | 7/2018 |
| EP | 3270297 A1 | 1/2018 |
| JP | 2017079048 A | 4/2017 |
| JP | 2018045607 A | 3/2018 |
| JP | 2018106555 A | 7/2018 |
| RU | 2013133259 A | 1/2015 |

OTHER PUBLICATIONS

Ruan Yi et al., "Introduction and Application of USB Type-C and PD Technology," Application of IC, vol. 34, No. 4 (Total No. 283); Apr. 2017; 12 total pages, including English translation.

* cited by examiner

Control, according to a motion status of a terminal that is detected by a motion sensor, an interface chip to configure a CC pin of a Type C interface to be in a low-level mode when it is determined that the status of the terminal changes from a moving state to a static state — S801

TERMINAL AND TYPE C INTERFACE ANTI-CORROSION METHOD

CROSS-REFERENCE TO RELATED APPLICATIONS

This application is a national stage of International Application No. PCT/CN2018/096893, filed on Jul. 24, 2018, which is hereby incorporated by reference in its entirety.

TECHNICAL FIELD

Embodiments of this application relate to the field of electronic science and technology, and in particular, to a terminal and a Type C interface anti-corrosion method.

BACKGROUND

A Type C interface is a common universal serial bus (universal serial bus, USB) interface, and has gradually become one of the mainstream USB interfaces because of its features such as a small size, a high maximum data transmission speed, and no need of distinguishing between front and rear sides.

A Type C interface includes a configuration channel (CC) pin, one of whose main functions is to identify a peripheral type, determine a master-slave relationship, and configure a working mode according to the master-slave relationship. Generally, working modes of the CC pin includes a dual role port (DRP) mode, an upstream facing port (UFP) mode, and a downstream facing port (DFP) mode. The DRP mode is a mode in which the UFP mode and the DPF mode are switched cyclically, so that the Type C interface can identify peripherals in different interface modes such as the UFP mode and the DFP mode, and determine a master-slave relationship between a terminal and a peripheral. Therefore, most Type C interfaces are in DRP mode when no peripheral is connected. The voltage level of the CC pin is a low level when the CC pin is in the UFP mode. The CC pin of the Type C interface is mostly in the UFP mode when the terminal is a slave device. The level of the CC pin is a high level when in the DFP mode. The CC pin of the Type C interface is mostly in the DFP mode when the terminal is a master device.

In a typical Type C interface, the CC pin is provided adjacent to the VBUS pin. When no peripheral is connected to the Type C interface, the CC pin is at a relatively high active voltage level, while the VBUS pin mostly has a low voltage level. As a result, there is a relatively large voltage difference between the CC pin and the VBUS pin. When liquid enters the Type C interface, electrochemical corrosion occurs easily between the adjacent CC pin and VBUS pin, thereby creating a micro short circuit between the CC pin and the VBUS pin. Consequently, a series of problems ensues, for example, a super fast-charge function would fail, and the terminal would consume power too quickly because the terminal cannot enter a standby state. Therefore, how to reduce the probability of electrochemical corrosion between pins of USB Type C is one of the important directions of current Type C interface research.

SUMMARY

Embodiments of this application provide a terminal and a Type C interface anti-corrosion method, for reducing the probability of electrochemical corrosion between a CC pin and another pin in a Type C interface.

According to a first aspect, an embodiment of this application provides a terminal that includes: a processor, an interface chip, a motion sensor, and a first Type C interface; where the processor is separately connected to the motion sensor and the interface chip; the interface chip is separately connected to the processor and a CC pin in the first Type C interface; the motion sensor is configured to monitor a motion status of the terminal; and the processor is configured to control, according to the motion status of the terminal that is detected by the motion sensor, the interface chip to configure the CC pin of the first Type C interface to be in a low-level mode when it is determined that the motion status of the terminal changes from a moving state to a static state.

When the motion status of the terminal changes from the moving state to the static state, the change in the motion status reflects that the terminal is disconnected from an external device. In this case, the terminal configures the CC pin to be in the low-level mode, so that an active level of the CC pin can be reduced. Because the active level of the CC pin is positively correlated with the probability that electrochemical corrosion occurs between the CC pin and another pin, reducing the active level of the CC pin can reduce the probability of electrochemical corrosion occurring between the CC pin and the other pin.

In a possible implementation, the interface chip is further connected to a VBUS pin in the first Type C interface, and is configured to obtain a VBUS voltage of the VBUS pin; and the processor is further configured to: obtain a voltage status of the VBUS pin from the interface chip, where the voltage status of the VBUS pin is determined by the interface chip according to whether the VBUS voltage of the VBUS pin is lower than a preset threshold; and control, when it is determined that the motion status of the terminal changes from the moving state to the static state and that the VBUS pin is in a first voltage state in which the VBUS voltage is lower than the preset threshold, the interface chip to configure the CC pin of the first Type C interface to be in the low-level mode.

The motion sensor has a specific failure rate. When it is determined that the motion status of the terminal changes from the moving state to the static state, the processor further determines that the VBUS pin is in the first voltage state in which the VBUS voltage is lower than the preset threshold, to ensure that the low-level mode is configured for the CC pin after the terminal is disconnected from the external device. In the low-level mode, the terminal cannot identify the external device. Therefore, ensuring that the low-level mode is configured for the CC pin after the terminal is disconnected from the external device reduces the possibility that the terminal cannot identify the external device because the low-level mode is incorrectly configured for the CC pin, and so on.

In a possible implementation, the processor is further configured to: control, when it is determined that the terminal is connected to an external device by using the first Type C interface, the interface chip to configure the CC pin of the first Type C interface to be in a high- and low-level alternate mode.

Only when the CC pin is in the high- and low-level alternate mode, the interface chip in the terminal can identify the external device connected by using the first Type C interface, and therefore data or electric energy can be transmitted. Therefore, when it is determined that the terminal is connected to the external device by using the first Type C interface, the processor controls the interface chip to configure the CC pin to be in the high- and low-level alternate mode, so that the interface chip can identify the external device.

In a possible implementation, the processor is specifically configured to: obtain the voltage status of the VBUS pin from the interface chip, where the voltage status of the VBUS pin is determined by the interface chip according to whether the VBUS voltage of the VBUS pin is lower than the preset threshold; and control, when it is determined that the VBUS pin is in a second voltage state in which the VBUS voltage is not lower than the preset threshold, the interface chip to configure the CC pin of the first Type C interface to be in the high- and low-level alternate mode.

The VBUS voltage on the VBUS pin in the Type C interface of the terminal is increased after one or more external devices having a Type C interface establish a physical connection to the terminal by using the Type C interface. When it is determined that the VBUS pin is in the second voltage state in which the VBUS voltage is not lower than the preset threshold, the processor may determine that the terminal is connected to an external device.

In a possible implementation, the processor is further configured to: control, when it is determined that the motion status of the terminal changes from the static state to the moving state, the interface chip to configure the CC pin of the first Type C interface to be in a high- and low-level alternate mode.

When the motion status of the terminal changes from the static state to the moving state, the change in the motion status reflects that the terminal is establishing a connection to the external device. In this case, the terminal controls the interface chip to configure the CC pin of the first Type C interface to be in the high- and low-level alternate mode, so that after the terminal establishes a physical connection to the external device, the interface chip in the terminal can immediately identify the external device by using the CC pin in the high- and low-level alternate mode.

In a possible implementation, the processor is further configured to: control, when it is determined that a display screen of the terminal is turned on, the interface chip to configure the CC pin of the first Type C interface to be in a high- and low-level alternate mode.

The foregoing technical solution provides a method in which the CC pin of the first Type C interface may be forcibly configured to be in the high- and low-level alternate mode. After the user connects the terminal to the external device, if the interface chip in the terminal fails to identify the external device, the user may turn on the display screen, to forcibly configure the CC pin of the first Type C interface to be in the high- and low-level alternate mode, so that the interface chip in the terminal can identify the external device.

In a possible implementation, the interface chip is further configured to cache a current working mode of the CC pin; and the processor is further configured to: obtain the current working mode of the CC pin from the interface chip; and when the current working mode of the CC pin is a transmission mode, stop controlling the interface chip to configure the CC pin to be in the low-level mode or the high- and low-level alternate mode, where the transmission mode is a corresponding working mode configured by the interface chip for the CC pin according to a working mode of a CC pin in a second Type C interface of the external device.

After the terminal establishes a connection to the external device, the motion status may change, the display screen may be turned on, and the like. In this case, regardless of whether the CC pin is configured to be in the low-level mode or the high- and low-level alternate mode, data or electric energy transmission between the terminal and the external device may be affected. Therefore, when the current working mode of the CC pin is the transmission mode, the processor stops controlling the interface chip to configure the CC pin to be in the low-level mode or the high- and low-level alternate mode, to avoid affecting the data or electric energy transmission between the terminal and the external device.

In a possible implementation, the interface chip configures the working mode of the CC pin according to a control signal provided by the processor; and the interface chip includes a control circuit, a pull-up power supply, a pull-up switch, a pull-up resistor, a pull-down switch, and a pull-down resistor, where one end of the pull-up resistor is connected to the pull-up power supply, the other end of the pull-up resistor is connected to a first electrode of the pull-up switch, and a second electrode of the pull-up switch is connected to the CC pin; one end of the pull-down resistor is grounded, the other end of the pull-down resistor is connected to a first electrode of the pull-down switch, and a second electrode of the pull-down switch is connected to the CC pin; and the control circuit is separately connected to a control electrode of the pull-up switch and that of the pull-down switch, and the control circuit is configured to control on and off of the pull-up switch and the pull-down switch according to a control signal of the processor.

In a possible implementation, the control circuit is specifically configured to turn off the pull-up switch and turn on the pull-down switch, according to a first control signal.

The control circuit turns off the pull-up switch according to the first control signal, so that the CC pin no longer receives a high level provided by the pull-up power supply. The control circuit turns on the pull-down switch at the same time to discharge the CC pin to the ground, so that a voltage level on the CC pin gradually approaches 0, thereby implementing the low-level mode.

In a possible implementation, the control circuit is specifically configured to turn off the pull-up switch and the pull-down switch according to a first control signal.

The control circuit turns off the pull-up switch and the pull-down switch according to the first control signal, so that the CC pin no longer receives a high level provided by the pull-up power supply. Although the control circuit turns off the pull-down switch at the same time, the CC pin can still discharge to the ground through a leakage current of the pull-down switch, so that a voltage level on the CC pin gradually approaches 0, thereby implementing the low-level mode.

In a possible implementation, the terminal further includes a first resistor, where one end of the first resistor is connected to the CC pin, and the other end of the first resistor is grounded; and the first resistor is configured to provide a discharge path for the CC pin.

When the control circuit turns off the pull-up switch and the pull-down switch according to the first control signal, the first resistor may provide the path for discharging the CC pin to the ground, so that the level of the CC pin approaches 0 more quickly, thereby implementing the low-level mode.

In a possible implementation, the control circuit is further configured to alternately turn on the pull-up switch and the pull-down switch periodically according to a second control signal.

The CC pin is at a high level when the control circuit turns on the pull-up switch and turns off the pull-down switch; and the CC pin is at a low level when the pull-up switch is turned off and the pull-down switch is turned on. Therefore, the control circuit may configure the high- and low-level alternate mode for the CC pin by alternately turning on the pull-up switch and the pull-down switch periodically according to the second control signal.

In a possible implementation, the control circuit is specifically configured to keep a first switch and a second switch off within a preset time interval after the pull-up switch and the pull-down switch are alternately turned on for several periods. The control circuit is further configured to, after the preset indirect interval, alternately turn on the pull-up switch and the pull-down switch again for several periods, until a first instruction is received or the working mode of the CC pin in the second Type C interface is identified.

After the pull-up switch and the pull-down switch are alternately turned on periodically for several periods, keeping the first switch and the second switch off may prolong low-level implementation of the CC pin in the high- and low-level alternate mode, thereby reducing the active level of the CC pin, and helping further reduce the possibility that electrochemical corrosion occurs between the CC pin and the other pin.

In a possible implementation, the interface chip includes a power delivery PD chip or a CC controller chip.

In a possible implementation, the motion sensor includes an acceleration sensor (Gsensor), and/or a gyroscope, and/or a gravity sensor.

According to a second aspect, an embodiment of this application provides a Type C interface anti-corrosion method. The method is applied to a processor in a terminal, the terminal further includes an interface chip, a first Type C interface, and a motion sensor, the processor is separately connected to the interface chip and the motion sensor, and the interface chip is separately connected to the processor and the first Type C interface. The Type C interface anti-corrosion method includes controlling, according to a motion status of the terminal that is detected by the motion sensor, the interface chip to configure a CC pin of the first Type C interface to be in a low-level mode when it is determined that the motion status of the terminal changes from a moving state to a static state.

In a possible implementation, the method further includes: obtaining the voltage status of the VBUS pin from the interface chip, where the voltage status of the VBUS pin is determined by the interface chip according to whether the VBUS voltage of the VBUS pin is lower than the preset threshold; and controlling, when it is determined that the motion status of the terminal changes from the moving state to the static state and that the VBUS pin is in a first voltage state in which the VBUS voltage is lower than the preset threshold, the interface chip to configure the CC pin of the first Type C interface to be in the low-level mode.

In a possible implementation, the method further includes controlling, when it is determined that the terminal is connected to an external device by using the first Type C interface, the interface chip to configure the CC pin of the first Type C interface to be in a high- and low-level alternate mode.

In a possible implementation, the determining that the terminal is connected to an external device by using the first Type C interface includes obtaining the voltage status of the VBUS pin from the interface chip, where the voltage status of the VBUS pin is determined by the interface chip according to whether the VBUS voltage of the VBUS pin is lower than the preset threshold; and controlling, when it is determined that the VBUS pin is in a second voltage state in which the VBUS voltage is not lower than the preset threshold, the interface chip to configure the CC pin of the first Type C interface to be in the high- and low-level alternate mode.

In a possible implementation, the method further includes controlling, when it is determined that the motion status of the terminal changes from the static state to the moving state, the interface chip to configure the CC pin of the first Type C interface to be in a high- and low-level alternate mode.

In a possible implementation, the method further includes controlling, when it is determined that a display screen of the terminal is turned on, the interface chip to configure the CC pin of the first Type C interface to be in a high- and low-level alternate mode.

In a possible implementation, the interface chip is further configured to cache a current working mode of the CC pin, and the method further includes: obtaining the current working mode of the CC pin from the interface chip; and when the current working mode of the CC pin is a transmission mode, stopping controlling the interface chip to configure the CC pin to be in the low-level mode or the high- and low-level alternate mode, where the transmission mode is a corresponding working mode configured by the interface chip for the CC pin according to a working mode of a CC pin in a second Type C interface of the external device.

DESCRIPTION OF EMBODIMENTS

Embodiments of this application are further described in detail below with reference to the accompanying drawings and embodiments.

Figure 1:
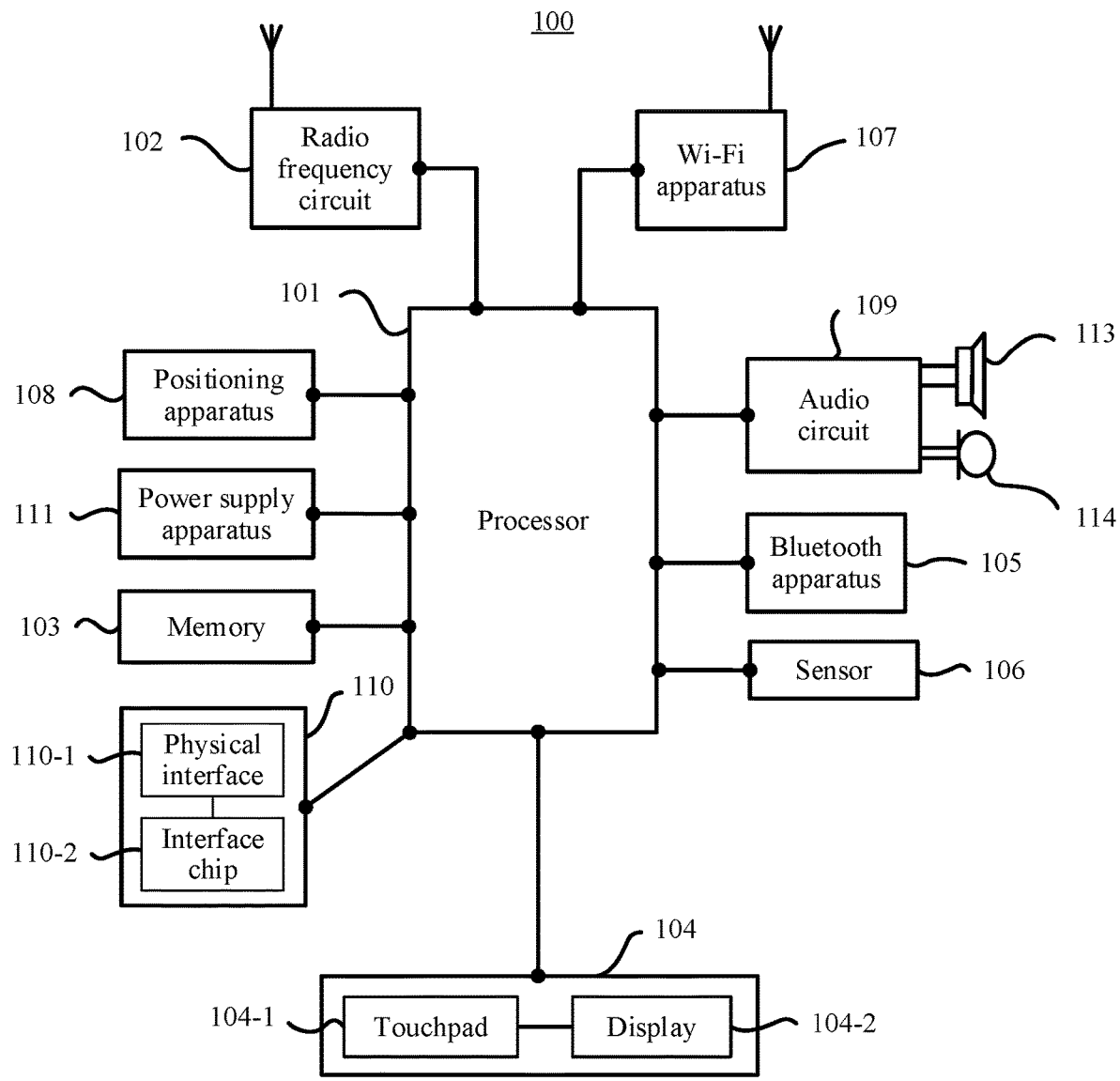
FIG. 1 is a schematic structural diagram of a feasible terminal according to an embodiment of this application.

An embodiment of this application provides a terminal. The terminal may be a terminal applicable to a Type C interface, such as a notebook computer, a smartphone, a tablet computer, a personal digital assistant, a digital video camera, or a smart home. For example, as shown in FIG. 1, a terminal 100 in this embodiment of this application may be a mobile phone. This embodiment is described in detail below by using an example of a structure of the terminal 100 being a mobile phone. It should be understood that the terminal 100 shown in the figure is merely an example of the terminal provided in this embodiment of this application, and the terminal 100 may have more or fewer components than those shown in the figure, may combine two or more components, or may have different component configurations. Various components shown in the figure may be implemented in hardware, software, or a combination of hardware and software, including one or more signal processing and/or application-specific integrated circuits.

As shown in FIG. 1, the terminal 100 may specifically include components such as one or more processors 101, a radio frequency (RF) circuit 102, a memory 103, a touchscreen 104, a Bluetooth apparatus 105, one or more sensors 106, a Wi-Fi apparatus 107, a positioning apparatus 108, an audio circuit 109, a peripheral interface 110, and a power supply apparatus 111. These components may communicate by using one or more communication buses or signal lines (not shown in FIG. 1). Persons skilled in the art may understand that a hardware structure shown in FIG. 1 does not constitute a limitation on the terminal 100, and the terminal 100 may include more or fewer components than those shown in the figure, or combine some components, or have different component arrangements.

The components of the terminal 100 are described in detail below with reference to FIG. 1:

The processor 101 is the control center of the terminal 100, which connects various parts of the terminal 100 by using various interfaces and lines and performs various functions of the terminal 100 and data processing by running or executing an application program (App) stored in the memory 103 and invoking data and an instruction stored in the memory 103. In some embodiments, the processor 101 may include one or more processing units; and the processor 101 may further integrate an application processor and a modem processor, where the application processor mainly implements an operating system, a user interface, an application program, and the like, and the modem processor mainly handles wireless communication. It may be understood that the modem processor may not be integrated into the processor 101. For example, the processor 101 may be a Kirin 960 chip manufactured by Huawei Technologies Co., Ltd. In addition, the processor may further include a sensor hub, which is configured to manage sensor data of the sensor 106 and a touchpad 104-1 and may work in low-power consumption when the processor 101 sleeps.

The radio frequency circuit 102 may be configured to receive and send a radio signal in an information receiving and sending process or in a call process. Specifically, the radio frequency circuit 102 may receive downlink data of a base station, and then send the downlink data to the processor 101 for processing; and in addition, send uplink-related data to the base station. Generally, the radio frequency circuit includes but is not limited to an antenna, at least one amplifier, a transceiver, a coupler, a low noise amplifier, a duplexer, and the like. In addition, the radio frequency circuit 102 may further communicate with another device through wireless communication. The wireless communication may use any communication standard or protocol, including but not limited to Global System for Mobile Communications, General Packet Radio Service, Code Division Multiple Access, Wideband Code Division Multiple Access, Long Term Evolution, Email, Short Message Service, and the like.

The memory 103 is configured to store an application program and data. The processor 101 implements various functions of the terminal 100 and data processing by running the application program and the data stored in the memory 103. The memory 103 mainly includes a program storage area and a data storage area. The program storage area may store an operating system and an application program required by at least one function (such as a sound playing function or an image playing function). The data storage area may store data (such as audio data and a phone book) created when the terminal 100 is in use. In addition, the memory 103 may include a high-speed random access memory, and may further include a nonvolatile memory, for example, a magnetic disk storage device, a flash memory, or another nonvolatile solid-state storage device. The memory 103 may store various operating systems, for example, an IOS® operating system developed by Apple, and an ANDROID® operating system developed by Google. For example, the memory 103 stores an application program related to this embodiment of this application, for example, a Taskcard store, Twitter, a phone book, or Weibo.

The touchscreen 104 may include the touchpad 104-1 and a display 104-2. The touchpad 104-1 may collect a touch event of a user of the terminal 100 on or near the touchpad 104-1 (for example, an operation performed by the user on or near the touchpad 104-1 by using any suitable object such as a finger or a stylus), and send collected touch information to another device such as the processor 101. The display (also referred to as a display screen) 104-2 may be configured to display information entered by the user or information provided for the user, and various menus of the terminal 100; and include a display screen driver chip, configured to drive, under control of the processor 101, a diode, a liquid crystal display, and the like in the display screen to work.

The terminal 100 may further include at least one sensor 106, for example, an optical sensor, a motion sensor, and another sensor. The motion sensor may include an acceleration sensor (Gsensor), and the acceleration sensor may monitor a magnitude of acceleration in each direction (generally three axes), so that a motion status of the terminal 100 can be monitored. In specific implementation, in addition to determining whether the terminal has been displaced, the motion sensor may further implement functions related to terminal posture identification, vibration identification, and the like according to a magnitude and a direction of detected gravity. In addition, the motion sensor may further include a gyroscope, a gravity sensor, and the like, to increase types of motion statuses that can be monitored. In this embodiment of this application, the sensor 106 includes at least the motion sensor. Therefore, the motion sensor is identified by a reference number 106 in this embodiment of this application.

The Wi-Fi apparatus 107 is configured to provide the terminal 100 with network access that complies with a Wi-Fi related standard protocol. The terminal 100 may access a Wi-Fi access point by using the Wi-Fi apparatus 107, to help the user receive and send an email, browse a web page, access streaming media, and the like. The Wi-Fi apparatus 107 provides the user with wireless broadband Internet access.

The positioning apparatus 108 is configured to provide a geographical location for the terminal 100. It may be understood that the positioning apparatus 108 may be specifically a receiver of a positioning system such as a global positioning system (GPS) or a BeiDou satellite navigation system. After receiving a geographical location sent by the positioning system, the positioning apparatus 108 sends the information to the processor 101 for processing, or sends the information to the memory 103 for storage.

The audio circuit 109, a loudspeaker 113, and a microphone 114 may provide an audio interface between the user and the terminal 100. The audio circuit 109 may transmit, to the loudspeaker 113, an electrical signal converted from received audio data, and the loudspeaker 113 converts the electrical signal into a sound signal for output; and in another aspect, the microphone 114 converts the collected sound signal into an electrical signal; and the audio circuit 109 converts it into audio data after receiving the electrical signal, and then outputs the audio data to the RF circuit 102 to send the audio data to, for example, a terminal, or outputs the audio data to the memory 103 for further processing.

The peripheral interface 110 is configured to provide various interfaces for an external device (for example, a keyboard, a mouse, an external display, an external memory, or a subscriber identity module card). For example, the terminal is connected to the mouse by using a universal serial bus interface, and is connected, by using a metal contact on a card slot of the subscriber identity module (SIM) card, to the subscriber identity module card provided by a telecommunications operator. The peripheral interface 110 may be configured to couple the input/output external device to the processor 101 and the memory 103. Specifically, the peripheral interface 110 includes a physical interface 110-1 and an interface chip 110-2. The peripheral interface 110 is configured to establish a physical connection to an external device, and the interface chip 110-2 is configured to implement adaptation between the terminal 100 and the external device, so that data transferred by using the physical interface 110-1 complies with a specification of an interface protocol. In this embodiment of this application, the physical interface 110-1 may be a Type C interface. Therefore, the Type C interface is identified by a reference number 110-1 in this embodiment of this application. The interface chip 110-2 may be a power delivery (PD) chip, or may be a CC controller chip. The interface chip 110-2 is configured to identify an external device, and perform adaptation between the terminal 100 and the external device, so that data transferred by using a Type C interface complies with a specification of a Type C protocol.

In addition, the terminal 100 may further include the power supply apparatus 111 (such as a battery and a power management chip) that supplies power to each component. The battery may be logically connected to the processor 101 by using the power management chip, to implement functions such as charging management, discharging management, and power consumption management by using the power supply apparatus 111.

Although not shown in FIG. 1, the terminal 100 may further include a camera, for example, a front-facing camera and a rear-facing camera. The front-facing camera may be configured to capture facial feature information, and the processor 101 may perform facial recognition on the facial feature information, to perform subsequent processing. The terminal 100 may further include a flash, a micro projection apparatus, a near field communication (NFC) apparatus, and the like. Details are not described herein.

All the following embodiments may be implemented in a terminal (for example, a terminal or a tablet computer) having the foregoing hardware structure. Specifically, the processor 101 may obtain the motion status of the terminal by using the motion sensor 106, to control, according to the motion status of the terminal, the interface chip 110-2 in the peripheral interface 110 to configure a working mode of the physical interface 110-1 (Type C interface 110-1).

Figure 2A:
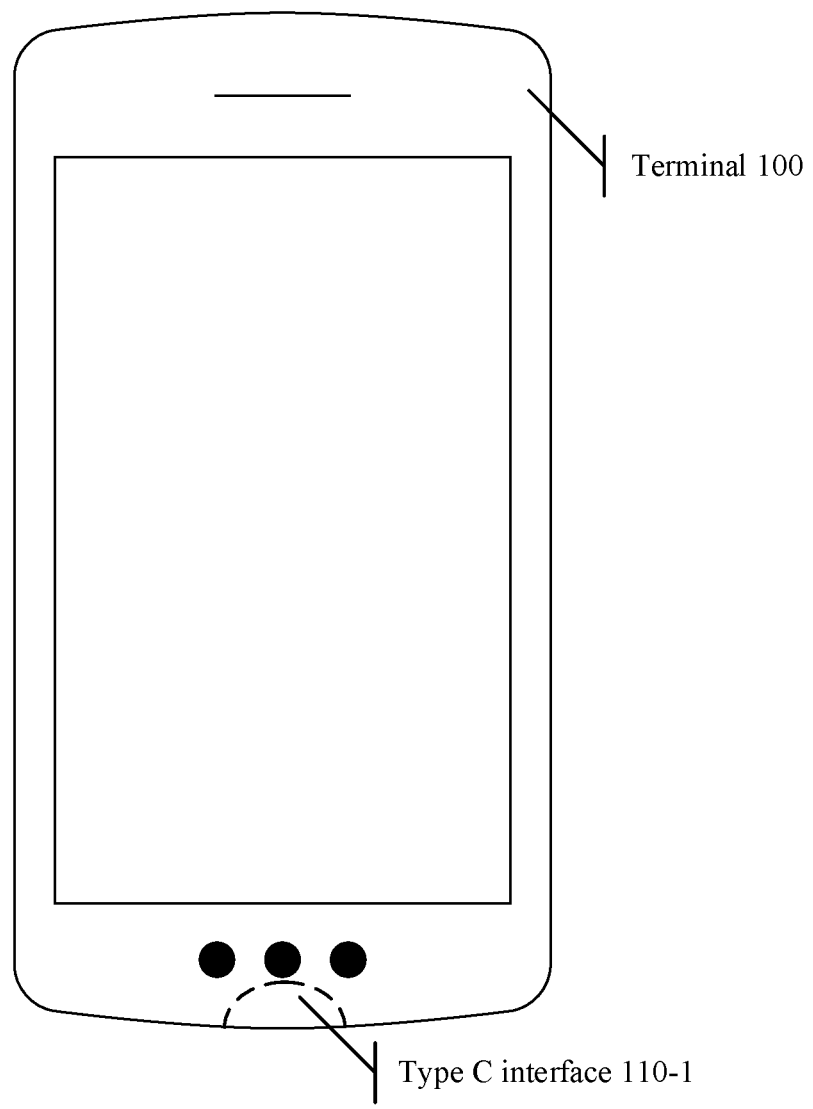
FIG. 2a to FIG. 2d are schematic diagrams of phases of a connection between a terminal and an external device according to an embodiment of this application.
Figure 2B:
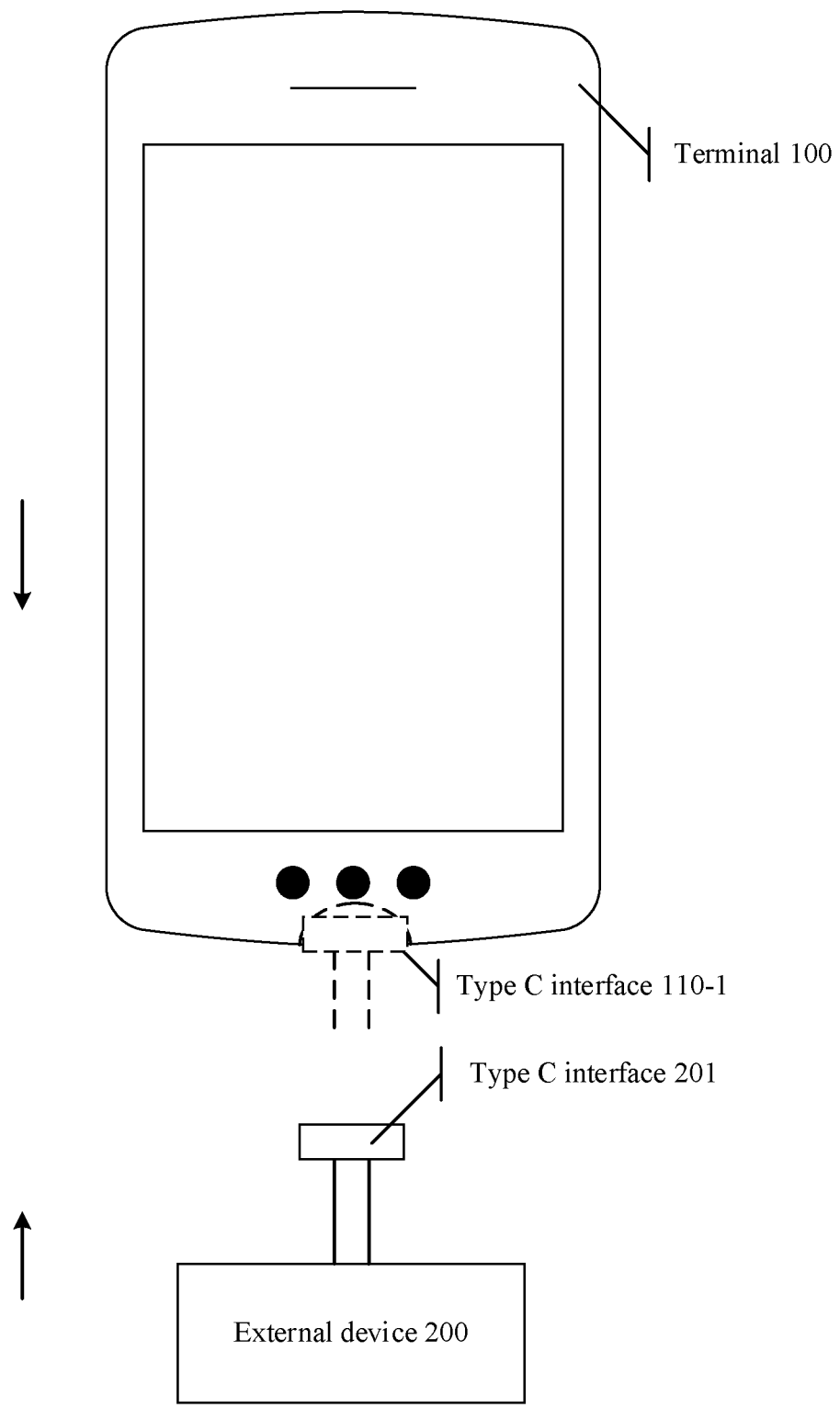
Figure 2C:
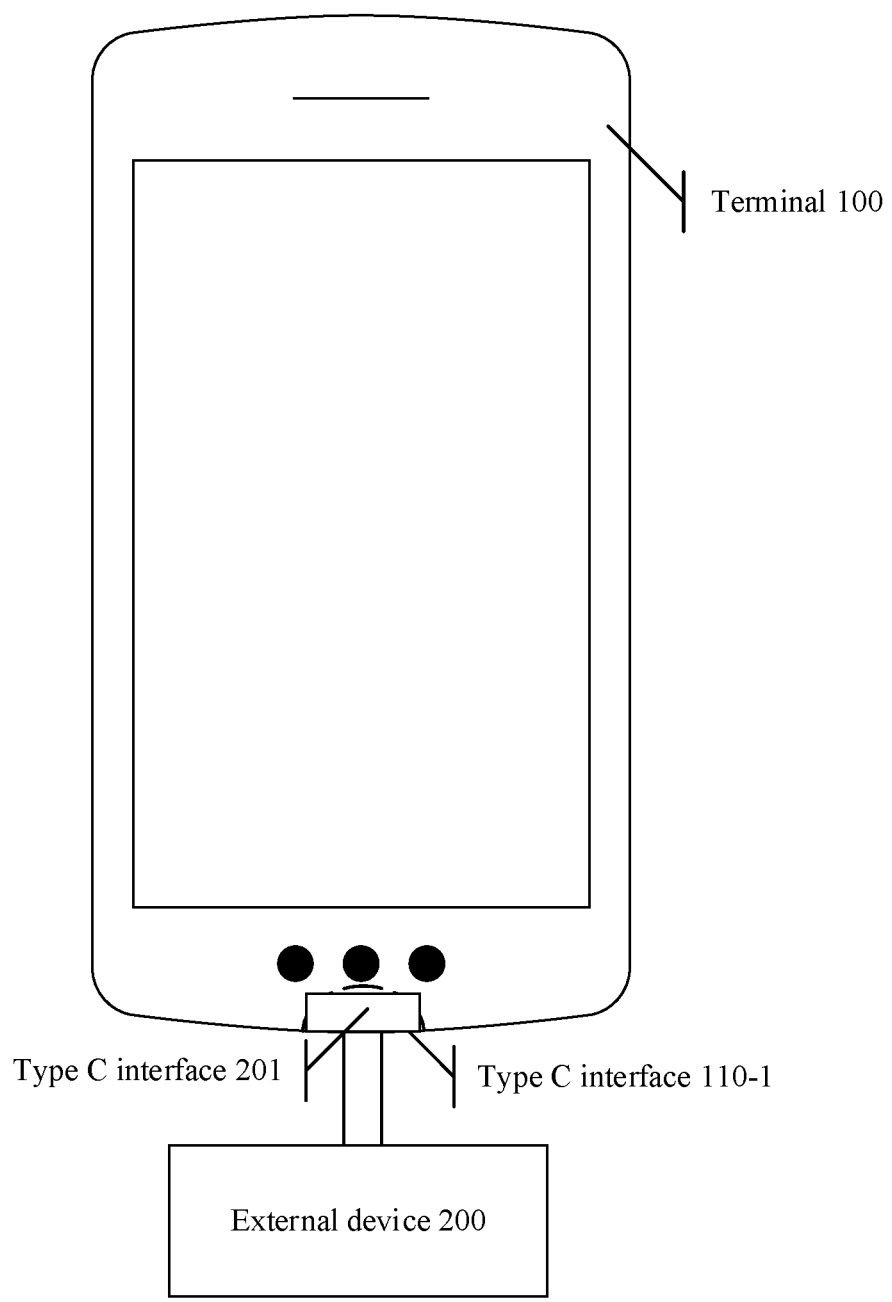
Figure 2D:
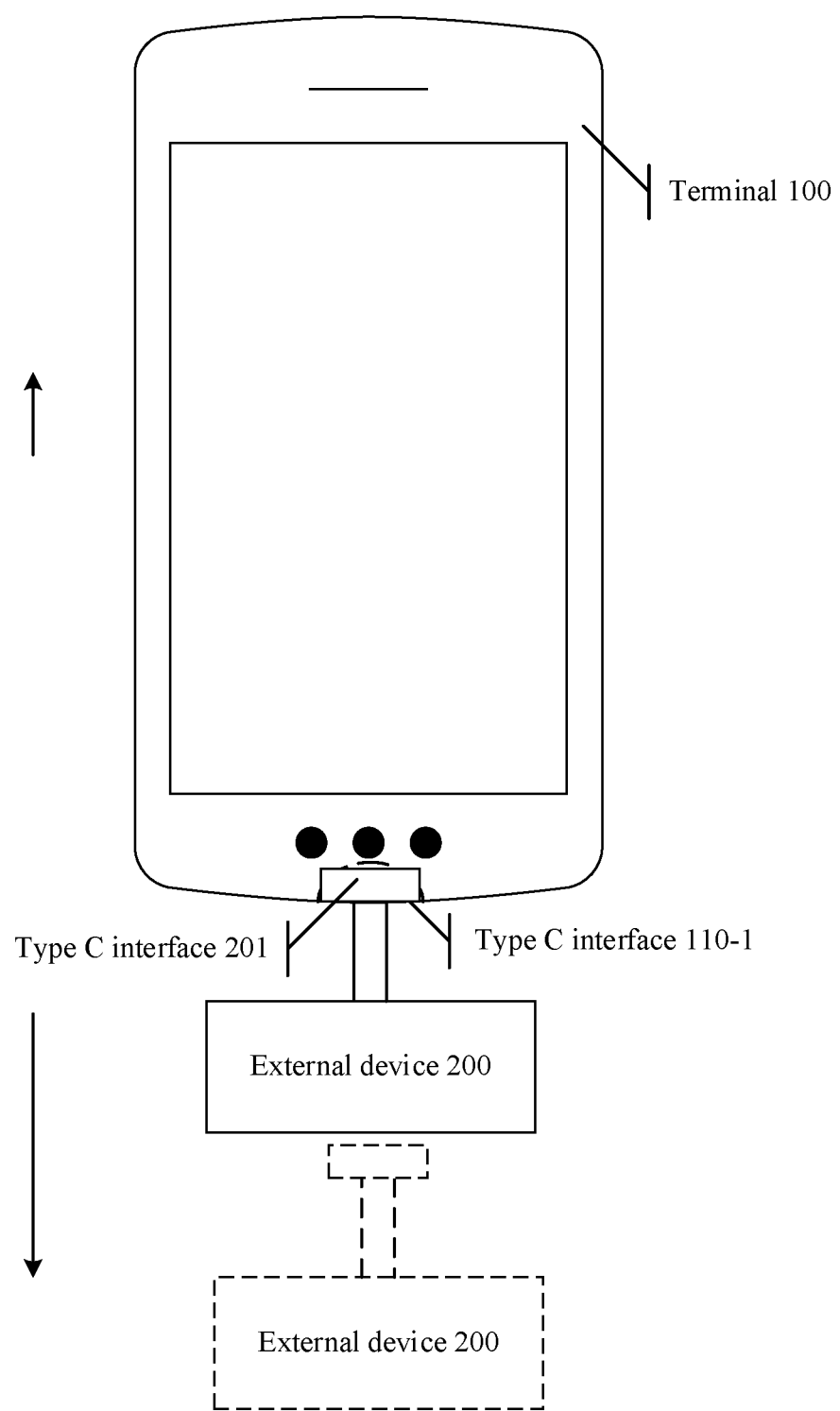

For ease of understanding, in this application, phases of a connection between the terminal and the external device in a use process are roughly classified into the following four types for description, including: not connected to the external device, being establishing a connection to the external device, connected to the external device, and being disconnected from the external device. As shown in FIG. 2a, the terminal 100 is in a phase in which the terminal 100 is not connected to the external device. The Type C interface 110-1 of the terminal 100 in this phase is not connected to the external device, and does not attempt to connect to the external device. As shown in FIG. 2b, the terminal 100 is in a phase in which the terminal 100 is establishing a connection to an external device 200. In this phase, the terminal 100 and the external device 200 move in directions indicated by arrows in the figure, so that the Type C interface 110-1 of the terminal 100 is connected to a Type C interface 201 of the external device 200, and a physical connection between the terminal 100 and the external device 200 is implemented. In addition, in this embodiment of this application, this phase further includes a phase in which mode identification is performed and a transmission mode is configured between the terminal 100 and the external device 200 by using the Type C interfaces 110-1 and 201 after the terminal 100 establishes the physical connection to the external device 200. As shown in FIG. 2c, the terminal 100 is in a phase in which the terminal 100 is connected to the external device 200, and data or electric energy is transmitted between the terminal 100 and the external device 200 in the transmission mode configured when the connection is established. As shown in FIG. 2d, the terminal 100 is in a phase in which the terminal 100 is being disconnected from the external device 200. After the phase shown in FIG. 2d, the terminal 100 returns to the phase shown in FIG. 2a in which the terminal 100 is not connected to the external device 200. It should be understood that there is no strict division boundary between the phases shown in FIG. 2a to FIG. 2d. The four phases provided in this embodiment of this application are merely used to explain the technical solutions provided in the embodiments of this application.

It should be understood that the Type C interface 110-1 of the terminal 100 may be in a form of a plug or a form of a socket. The Type C interface 110-1 of the terminal 100 may be directly connected to a Type C interface of an external device. The external device may be an external device with a Type C interface, or may be an external device that is connected to a Type C data line and that implements a connection to the terminal by using a Type C interface on the Type C data line.

Figure 3:
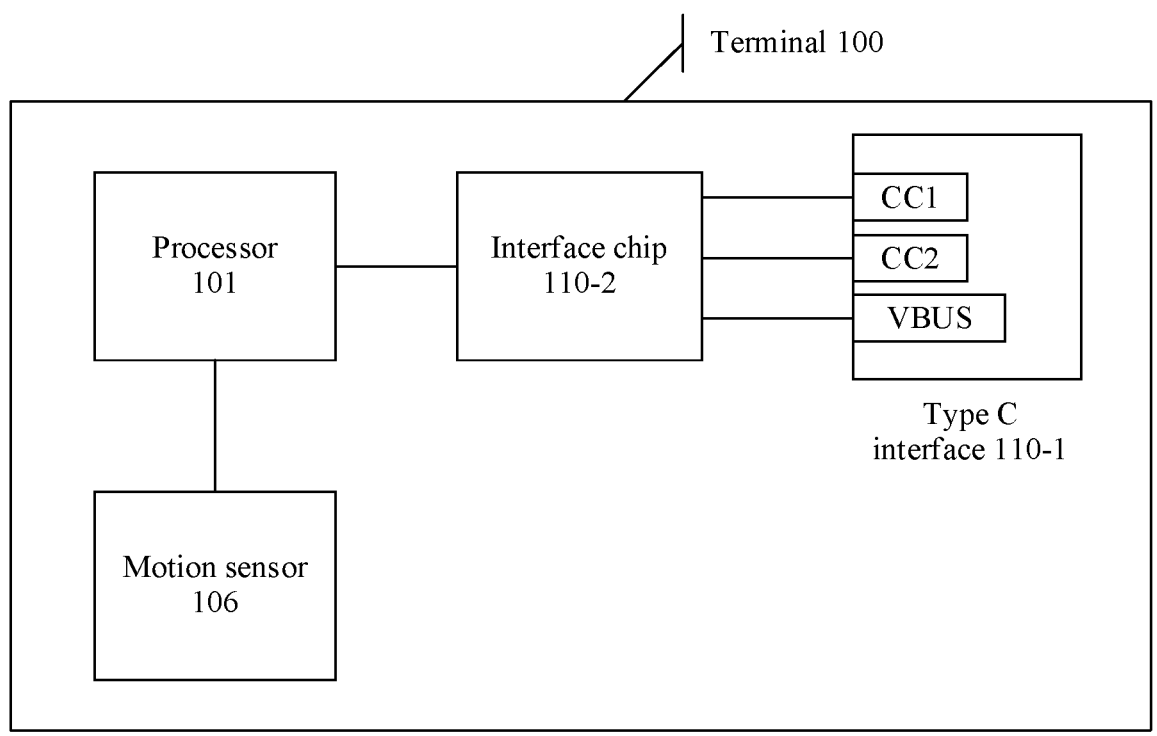
FIG. 3 is a schematic structural diagram of a feasible terminal according to an embodiment of this application.

FIG. 3 is a schematic structural diagram of a feasible terminal according to an embodiment of this application. As shown in FIG. 3, a terminal 100 includes a processor 101, an interface chip 110-2, a motion sensor 106, and a Type C interface 110-1. The processor 101 is separately connected to the interface chip 110-2 and the motion sensor 106. In addition, the interface chip 110-2 is further connected to the Type C interface 110-1 while being connected to the processor 101. The motion sensor 106 may monitor a motion status of the terminal 100. According to the motion status monitored by the motion sensor 106, when it is determined that the motion status of the terminal 100 changes from a moving state to a static state, the processor 101 may control the interface chip 110-2 to configure a CC pin of the Type C interface 110-1 to be in a low-level mode, thereby reducing an active level of the CC pin. Because a probability that electrochemical corrosion occurs between pins is positively correlated with a magnitude of a voltage difference between the pins, reducing the active level of the CC pin may reduce a probability that electrochemical corrosion occurs between the CC pin and another pin in the Type C interface 110-1.

For example, when the terminal 100 is in a phase shown in FIG. 1d in which the terminal 100 is being disconnected from an external device 200, the terminal 100 needs to move for a distance along a direction indicated by an arrow in the figure before two Type C interfaces (110-1 and 201) can be physically disconnected. Therefore, the motion status of the terminal 100 that is detected by the motion sensor 106 at this time is a moving state. After the phase shown in FIG. 1*d*, to be specific, after the Type C interface 201 of the external device 200 is separated from the Type C interface 110-1 of the terminal 100, the terminal enters a phase shown in FIG. 1*a* in which the terminal is not connected to the external device. The terminal 100 is often static in the phase shown in FIG. 1*a*. In this case, the motion status of the terminal 100 that is detected by the motion sensor 106 is a static state. Therefore, when it is determined that the motion status of the terminal 100 changes from the moving state to the static state, the processor 101 may consider that the terminal 100 enters the phase shown in FIG. 1*a* in which the terminal is neither connected to the external device nor attempts to connect to the external device. In this phase, the processor 101 controls the interface chip 110-2 to configure the CC pin in the Type C interface 110-1 to be in the low-level mode, so that use of the Type C interface 110-1 is not affected, and the probability that electrochemical corrosion occurs between the CC pin and the other pin in the Type C interface 110-1 can be reduced.

Figure 4:
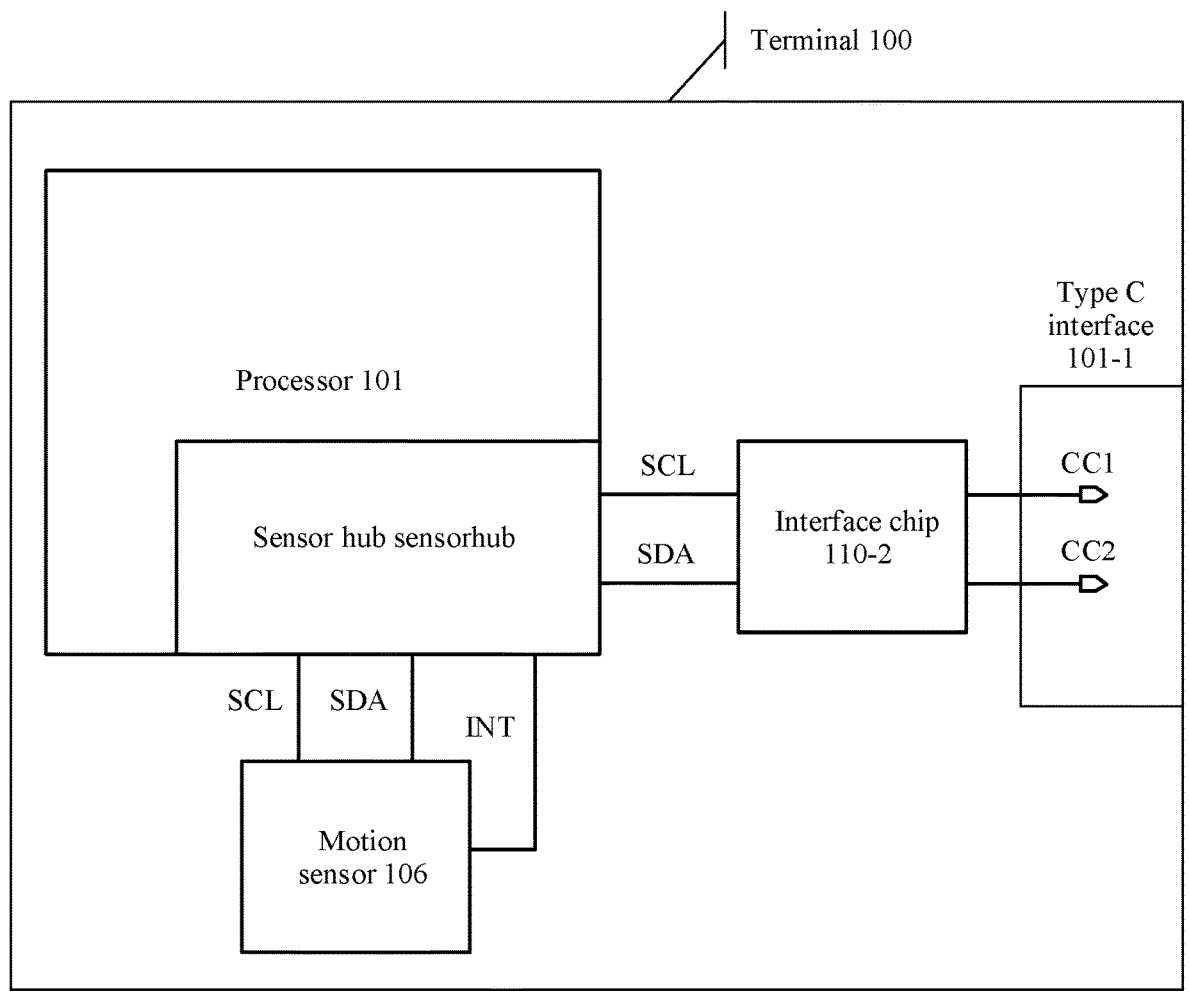
FIG. 4 is a schematic structural diagram of a feasible terminal according to an embodiment of this application.

In the terminal 100 shown in FIG. 3, the processor 101 may obtain the motion status of the terminal 100 from the motion sensor 106 through an electrical connection to the motion sensor 106. Specifically, connections such as an inter-integrated circuit (I2C) bus connection and an interrupt (INT) signal line connection may be included between the motion sensor 106 and the processor 101. As shown in FIG. 4, the motion sensor 106 and the processor 101 are connected by using an I2C. The I2C connection includes a serial clock line (SCL) and a serial data line (SDA). Based on a connection manner, shown in FIG. 4, between the motion sensor 106 and the processor 101, in an implementation, the processor 101 may periodically obtain, through an I2C connection to the motion sensor 106, the motion status of the terminal 100 that is detected by the motion sensor 106, to determine a change in the motion status of the terminal 100.

In another implementation, as shown in FIG. 4, an INT connection is further included between the processor 101 and the motion sensor 106. After the motion sensor 106 detects that the motion status of the terminal 100 changes, the motion sensor 106 sends an interrupt signal to the processor 101 through the INT connection to the processor 101. The interrupt signal may wake up the processor 101. After receiving the interrupt signal, the processor 101 obtains the motion status of the terminal 100 from the motion sensor 106 through the I2C connection. When the motion status of the terminal 100 that is obtained from the motion sensor 106 is a moving state, the processor 101 may determine that the motion status of the terminal 100 changes from the static state to the moving state; or when the motion status of the terminal 100 that is obtained from the motion sensor 106 is a static state, the processor 101 may determine that the motion status of the terminal 100 changes from the moving state to the static state. In this implementation, the processor 101 does not need to frequently obtain the motion status of the terminal 100 from the motion sensor 106, thereby helping reduce power consumption of the terminal 100.

In addition, as shown in FIG. 4, the processor 101 is specifically connected to the motion sensor 106 by using a sensor hub inside the processor 101, the sensor hub receives, through the INT connection, the interrupt signal sent by the motion sensor 106, and the sensor hub obtains the motion status of the terminal 100 from the motion sensor 106 through the I2C connection, so that when the motion status of the terminal 100 changes, the interrupt signal sent by the motion sensor 106 wakes up only the sensor hub in the processor 101, but does not wake up the processor 101 as a whole, thereby helping further reduce power consumption of the terminal 100. Based on a similar principle, as shown in FIG. 4, the processor 101 may also be connected to the interface chip 110-2 by using the sensor hub, to reduce power consumption of the terminal 100.

In this embodiment of this application, the processor 101 may control, according to the motion status of the terminal 100 that is detected by the motion sensor 106, the interface chip 110-2 to configure a working mode of the CC pin in the Type C interface 110-1. Specifically, the processor 101 may generate a control signal according to the motion status of the terminal 100, and control, by using the control signal, the interface chip 110-2 to configure the working mode of the CC pin in the Type C interface 110-1. In the terminal 100 shown in FIG. 4, the processor 101 and the interface chip 110-2 may be connected by using an I2C. The processor 101 may send the control signal to the interface chip 110-2 through an I2C connection (SDA and SCL), to control the interface chip 110-2 to configure the working mode of the CC pin in the Type C interface 110-1.

It is considered that the motion sensor 106 has a specific failure rate. Therefore, if it is mistakenly detected, due to an individual problem of the motion sensor 106, that the terminal 100 enters the static state from the motion state, the processor 101 controls the interface chip 110-2 to configure the CC pin in the Type C interface 110-1 of the terminal 100 in a non-static state to be in the low-level mode, and consequently, the interface chip 110-2 in the terminal 100 cannot identify an external device of an OTG (on-the-go) type. This is because a working mode of a CC pin in a Type C interface of the external device of the OTG type is coupled to a UFP mode, and the interface chip 110-2 can identify the external device only when the CC pin in the Type C interface 110-1 is in a DRP mode or a DFP mode.

Therefore, to improve reliability of determining the phase shown in FIG. 1*a*, after determining that the terminal 100 enters the static state from the moving state, the processor 101 may further determine whether a VBUS voltage of a VBUS pin in the Type C interface 110-1 is lower than a preset threshold. As shown in FIG. 3, the interface chip 110-2 is further connected to the VBUS pin in the Type C interface 110-1. The interface chip 110-2 may obtain the VBUS voltage on the VBUS pin, and determine a voltage status of the VBUS pin according to a relative magnitude relationship between the VBUS voltage and the preset threshold. In this embodiment of this application, the voltage status of the VBUS pin includes a first voltage state in which the VBUS voltage is lower than the preset threshold and a second voltage state in which the VBUS voltage is not lower than the preset threshold. After determining that the terminal 100 enters the static state from the moving state, the processor 101 may further obtain a current voltage state of the VBUS pin through the I2C connection to the interface chip 110-2, and control, only when it is determined that the VBUS pin is in the first voltage state, the interface chip 110-2 to configure the working mode of the CC pin in the Type C interface 110-1 as the low-level mode.

Usually, in the phase shown in FIG. 1*a* in which the terminal 100 is not connected to the external device, the VBUS voltage of the VBUS pin in the Type C interface 110-1 of the terminal 100 is at a low level. In this case, the VBUS pin is in the first voltage state. Therefore, when the motion status of the terminal 100 changes from the moving state to the static state, and the VBUS voltage status of the VBUS pin is the first voltage state in which the VBUS voltage is lower than the preset threshold, it means, to a large extent, that the terminal 100 is in the phase shown in FIG. 1*a* in which the terminal 100 is not connected to the external device. In this case, the processor 101 controls the interface chip 110-2 to configure the CC pin in the Type C interface 110-1 to be in the low-level mode, thereby helping reduce a possibility that the interface chip 110-2 in the terminal 100 cannot identify the external device because the low-level mode is incorrectly configured for the CC pin.

In this embodiment of this application, the processor 101 may control the interface chip 110-2 to configure the working mode of the CC pin in the Type C interface 110-1. The interface chip 110-2 is connected to the Type C interface 110-1. The interface may receive a control signal sent by the processor 101, and configure a working mode of the Type C interface 110-1 according to the received control signal. In a specific implementation, the interface chip 110-2 may be separately connected to a plurality of pins in the Type C interface 110-1, including a connection to two CC pins in the Type C interface 110-1: CC1 and CC2; and after receiving a control signal, the interface chip 110-2 may separately configure a working mode of the CC1 and that of the CC2 according to the control signal.

Figure 5:
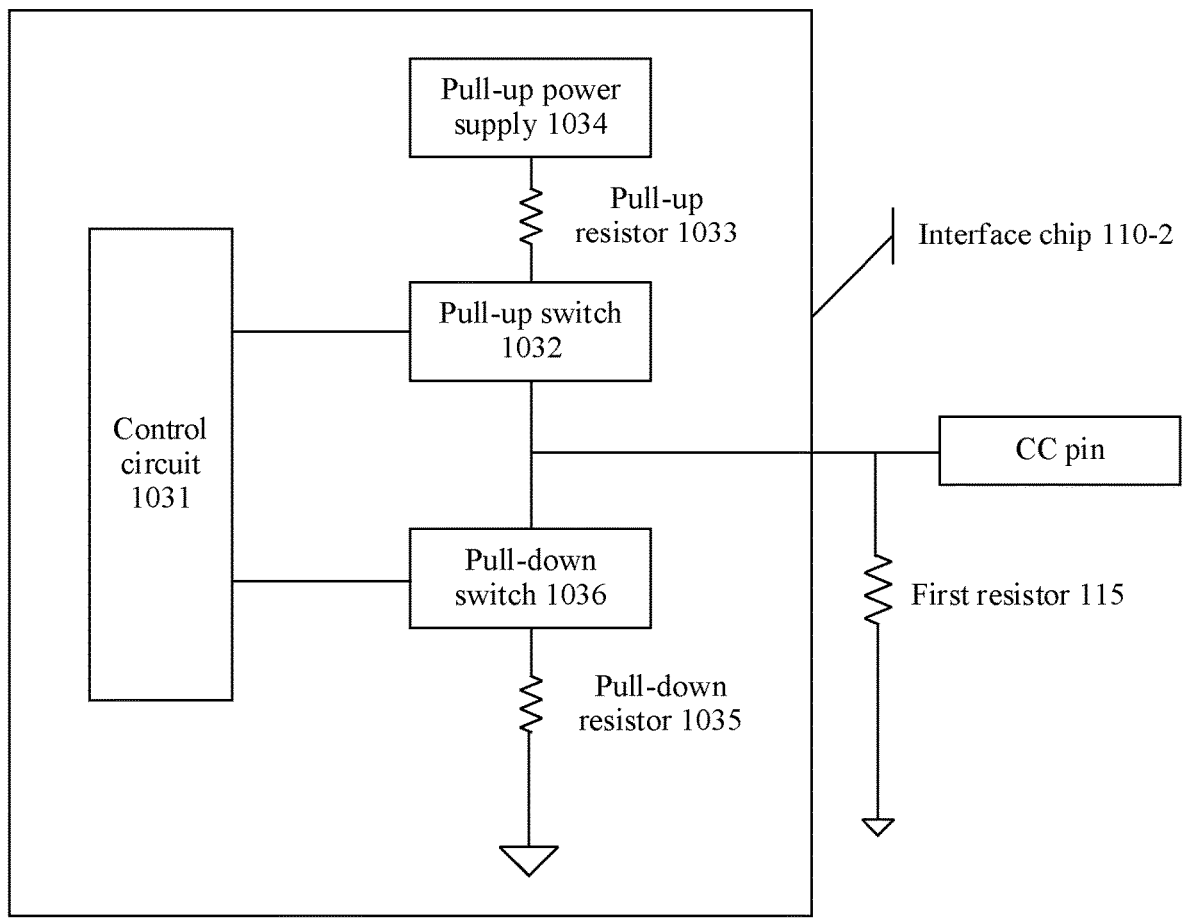
FIG. 5 is a schematic structural diagram of an interface chip according to an embodiment of this application.

Based on this, FIG. 5 is a schematic structural diagram of an interface chip according to an embodiment of this application. As shown in FIG. 5, the interface chip 110-2 includes a control circuit 1031, a pull-up switch 1032, a pull-up resistor 1033, a pull-up power supply 1034, a pull-down resistor 1035, and a pull-down switch 1036.

One end of the pull-up resistor 1033 is connected to the pull-up power supply 1034, the other end of the pull-up resistor 1033 is connected to a first electrode of the pull-up switch 1032, and a second electrode of the pull-up switch 1032 is connected to the CC pin of the Type C interface 110-1. One end of the pull-down resistor 1035 is grounded, the other end of the pull-down resistor 1035 is connected to a first electrode of the pull-down switch 1036, and a second electrode of the pull-down switch 1036 is connected to the CC pin of the Type C interface 110-1. The control circuit 1031 is separately connected to a control electrode of the pull-up switch 1032 and that of the pull-down switch 1036, and is configured to control on and off of the pull-up switch 1032 and the pull-down switch 1036 according to a control signal sent by the processor 101.

In a specific implementation, the pull-up power supply is configured to provide a high level for the CC pin, and may be a direct current/direct current (DC/DC) converter in the terminal 100, or may be a low dropout regulator (LDO).

Based on a specification of a Type C protocol, the working mode configured by the interface chip 110-2 for the CC pin corresponds to a DFP mode when the pull-up switch 1032 is turned on and the pull-down switch 1036 is turned off. The working mode configured by the interface chip 110-2 for the CC pin corresponds to a UFP mode when the pull-up switch 1032 is turned off and the pull-down switch 1036 is turned on. And the working mode configured by the interface chip 110-2 for the CC pin corresponds to a DRP mode when the pull-up switch 1032 and the pull-down switch 1036 are alternately turned on periodically, for example, within a period T, the pull-up switch 1032 is turned off and the pull-down switch 1036 is turned on within a first time interval t1, and the pull-up switch 1032 is turned on and the pull-down switch 1036 is turned off within a second time interval t2 (t1+t2=T).

In this embodiment of this application, the processor 101 may control, by sending a first control signal to the interface chip 110-2, the interface chip 110-2 to configure the CC pin in the Type C interface 110-1 to be in the low-level mode. After receiving the first control signal sent by the processor 101, the interface chip 110-2 may configure the low-level mode for the CC pin of the Type C interface 110-1 in at least the following two manners.

In an implementation, the control circuit 1031 turns off the pull-up switch 1032 and turns on the pull-down switch 1036, according to the first control signal. In this case, the CC pin stops receiving the high level voltage from the pull-up power supply 1034, and discharges to the ground via the pull-down switch 1036 and the pull-down resistor 1035, so that the voltage level on the CC pin gradually approaches 0, thereby implementing the low-level mode. In this case, the working mode of the CC pin of the Type C interface 110-1 corresponds to the UFP mode specified in the Type C protocol.

In another implementation, the control circuit 1031 simultaneously turns off the pull-up switch 1032 and the pull-down switch 1036 according to the first control signal; and the CC pin stops receiving the high level voltage from the pull-up power supply 1034, and can still gradually discharge to the ground because of a leakage current existing in the pull-down switch 1036, so that the voltage level on the CC pin gradually approaches 0. Further, as shown in FIG. 5, the terminal 100 further includes a first resistor 115, where one end of the first resistor 115 is connected to the CC pin, and the other end of the first resistor 115 is grounded. The first resistor 115 may provide a path for discharging to the ground for the CC pin when the control circuit 1031 simultaneously turns off the pull-up switch 1032 and the pull-down switch 1036. The CC pin may discharge to the ground by using the first resistor 115, so that the level voltage on the CC pin approaches 0 more quickly, and accordingly the CC pin can be configured, more quickly, to be in the low-level mode.

In addition, in this implementation, to reduce the impact of the first resistor 115 on the level of the CC pin in the DFP mode and the UFP mode, a resistance value of the first resistor 115 should be far greater than a resistance value of the pull-up resistor 1033 and that of the pull-down resistor 1035, so that in the UFP mode and the DFP mode, a ground path constituted of the first resistor 115 can approximate to an open circuit. In addition, the resistance value of the pull-down resistor 1035 is 5.1 k. In order not to affect precision of the pull-down switch 1036, the resistance value of the first resistor 115 may be 500 k or 1 Mohm.

In the foregoing two implementations, the working mode of the CC pin may be configured as a low-level working mode, thereby reducing an active level of the CC pin before the terminal 100 is connected to the external device next time, and further reducing the probability that electrochemical corrosion occurs between the CC pin and the other pin.

In this embodiment of this application, when the terminal 100 is in the phase in which the terminal 100 is not connected to the external device, the processor 101 controls the interface chip 110-2 to configure the CC pin of the Type C interface 110-1 to be in the low-level mode. However, when the terminal 100 is in a phase shown in FIG. 1*b* in which the terminal 100 is establishing a connection to the external device 200, after the terminal 100 establishes a physical connection to the external device 200, the interface chip 110-2 may identify a CC pin in the Type C interface 201 of the external device 200 by using the CC pin in a high- and low-level alternate mode. If the CC pin in the Type C interface 110-1 of the terminal 100 is still in the low-level mode in the phase shown in FIG. 1b, the interface chip 110-2 cannot identify a working mode of the CC pin in the Type C interface 201 of the external device 200. Based on this, this embodiment of this application provides at least the following three implementations, to ensure that in the phase shown in FIG. 1b, the interface chip 110-2 can identify the working mode of the CC pin in the Type C interface 201.

In a first implementation, according to the motion status of the terminal 100 that is provided by the motion sensor 106, when it is determined that the terminal 100 enters the moving state from the static state, the processor 101 controls the interface chip 110-2 to configure the CC pin of the Type C interface 110-1 to be in the high- and low-level alternate mode. In the phase shown in FIG. 1b, the terminal 100 needs to move for a distance along an arrow direction in the figure before the physical connection can be established to the external device 200. Therefore, when the terminal 100 enters the moving state from the static state, it means that the terminal 100 may enter the phase shown in FIG. 1b. In this case, the processor 101 controls the interface chip 110-2 to configure the CC pin to be in the high- and low-level alternate mode, so that it can be ensured that when the terminal 100 is in the phase in FIG. 1b, the interface chip 110-2 in the terminal 100 can identify the working mode of the CC pin in the Type C interface 201 of the external device 200 after the terminal 100 establishes the physical connection to the external device 200.

In a second implementation, when it is determined that the terminal 100 is connected to the external device 200 by using the Type C interface 110-1, the processor 101 may control the interface chip 110-2 to configure the CC pin of the Type C interface 110-1 to be in the high- and low-level alternate mode.

Specifically, the processor 101 may obtain the current voltage state of the VBUS pin from the interface chip 110-2; and control, when it is determined that the VBUS pin is in the second voltage state in which the VBUS voltage is not lower than the preset threshold, the interface chip 110-2 to configure the CC pin in the Type C interface 110-1 to be in the high- and low-level alternate mode. Apparently, the interface chip 110-2 may alternatively send an interrupt signal to the processor 101 when the voltage status of the VBUS pin changes from the first voltage state to the second voltage state. After receiving the interrupt signal, the processor 101 may determine that the terminal 100 establishes the physical connection to the external device 200, to control the interface chip 110-2 to configure the CC pin of the Type C interface 110-1 to be in the high- and low-level alternate mode.

In this embodiment of this application, a type of the external device 200 is not fixed, for example, may be classified into at least the following two types: 1. The VBUS pin of the Type C interface 110-1 enters the second voltage state from the first voltage state after the terminal establishes a physical connection to a first-type external device 200. 2. The VBUS pin of the Type C interface 110-1 is still in the first voltage state after the terminal 100 establishes a physical connection to a second-type external device 200, and the VBUS pin in the Type C interface 110-1 of the terminal 100 enters the second voltage state from the first voltage state only after the terminal 100 identifies the external device 200 and configures a transmission mode. It can be learned that the second implementation is applicable to the case in which the terminal 100 is connected to the first-type external device 200, and may be used in combination with the first implementation in some specific implementations.

In a third implementation, alternatively, when it is determined that a display screen is turned on, the processor 101 may control the interface chip 110-2 to configure the CC pin of the Type C interface 110-1 to be in the high- and low-level alternate mode.

Figure 6:
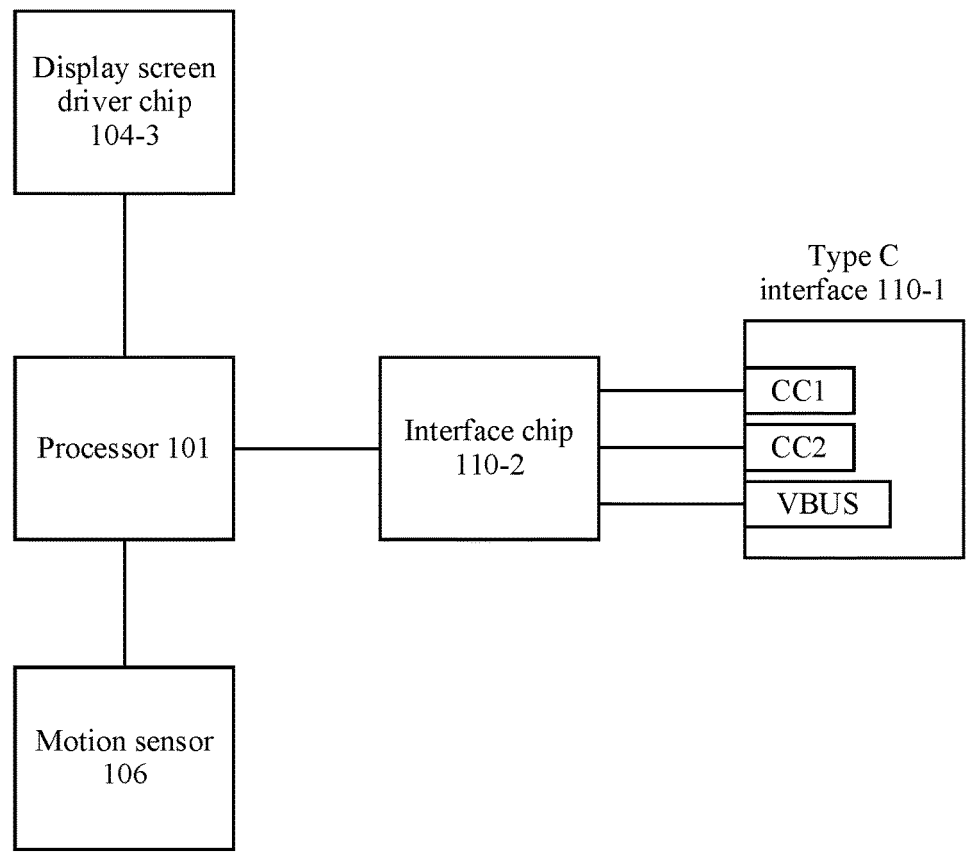
FIG. 6 is a schematic structural diagram of a feasible terminal according to an embodiment of this application.

In a specific implementation, as shown in FIG. 6, the terminal 100 further includes a display screen driver chip 104-3; and the display screen driver chip 104-3 is connected to the processor 101, and is configured to send an interrupt signal to the processor 101 when the display screen is turned on, where the interrupt signal may wake up the processor 101. After receiving the interrupt signal sent by the display screen driver chip 104-3, the processor 101 controls the interface chip 110-2 to configure the CC pin in the Type C interface 110-1 to be in the high- and low-level alternate mode. Apparently, in specific implementation, the display screen driver chip 104-3 may also be connected to the sensor hub of the processor 101, to reduce power consumption of the terminal 100.

In the third implementation, a terminal user is provided with a way for forcibly configuring the CC pin of the Type C interface 110-1 to be in the high- and low-level alternate mode. After the user physically connects the terminal 100 to the external device 200, if the interface chip 110-2 of the terminal 100 fails to identify the Type C interface 201 of the external device 200, the user may configure, in a manner of manually turning on the display screen, the CC pin of the Type C interface 110-1 to be in the high- and low-level alternate mode, so that the interface chip 110-2 can identify the Type C interface 201 of the external device 200.

It should be understood that the foregoing three implementations are not mutually exclusive, and may all be implemented in the terminal 100. For example, the processor 101 separately configures different priorities for the three implementations. The interrupt signal provided by the display screen driver chip 104-3 has a highest priority, the motion status of the terminal 100 that is provided by the motion sensor 106 has a second priority, and the voltage status of the VBUS pin that is provided by the interface chip 110-2 has a lowest priority. After the processor 101 receives the interrupt signal sent by the display screen driver chip 104-3, regardless of a specific state of the voltage status of the VBUS pin and a specific state of the motion status of the terminal 100 at this time, the processor 101 immediately controls the interface chip 110-2 to configure the CC pin in the Type C interface 110-1 to be in the high- and low-level alternate mode.

In this embodiment of this application, the processor 101 may control the interface chip 110-2 to configure the CC pin in the Type C interface 110-1 to be in the high- and low-level alternate mode. In a specific implementation, the processor 101 may control, by sending a second control signal to the interface chip 110-2, the interface chip 110-2 to configure the CC pin in the Type C interface 110-1 to be in the high- and low-level alternate mode.

Figure 7:
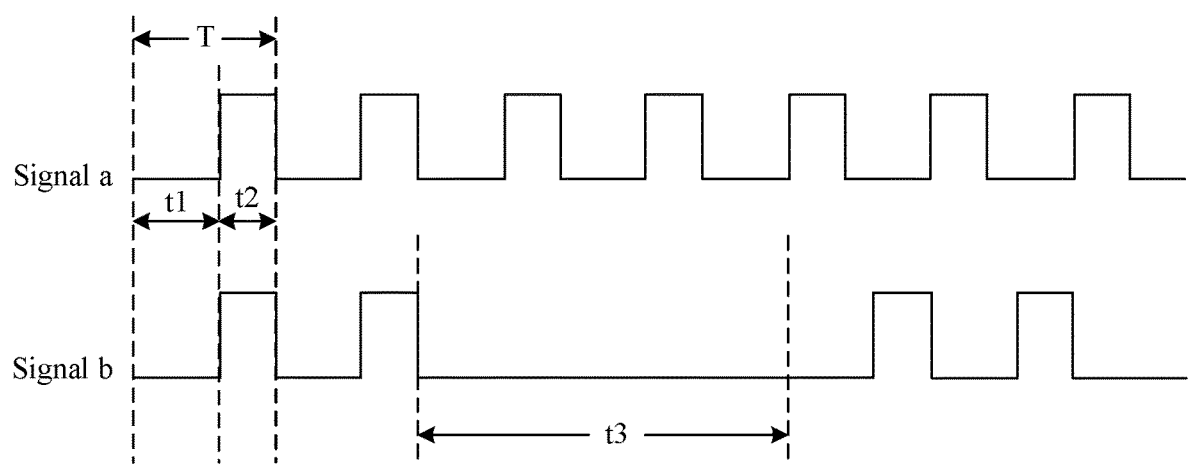
FIG. 7 is a schematic diagram of a level signal according to an embodiment of this application.

In referring to the interface chip 110-2 shown in FIG. 5, after the interface chip 110-2 receives the second control signal, the control circuit 1031 alternately turns on the pull-up switch 1032 and the pull-down switch 1036 periodically according to the second control signal, and the working mode of the CC pin corresponds to the DRP mode specified in the Type C protocol. In this case, a level signal provided by the interface chip 110-2 for the CC pin may be a signal as shown in FIG. 7, where T is a DRP period, t1 is low-level duration in the DRP period, and t2 is high-level duration in the DRP period. Generally, T may be 65 ms, t1 may be 50 ms, and t2 may be 15 ms. Within the time t1, the CC pin is at a low level, and the interface chip 110-2 may identify an external device in a DFP mode by using the CC pin. And within the time t2, the CC pin is at a high level, and the interface chip 110-2 may identify an external device in a UFP mode by using the CC pin. The pull-up switch 1032 and the pull-down switch 1036 in the interface chip 110-2 are alternately turned on periodically, so that the interface chip 110-2 can identify external devices in different working modes of CC pins by using the CC pin in the high- and low-level alternate mode.

To further reduce an active level of the CC pin of the Type C interface 110-1 when the terminal 100 is in the phase in which the terminal 100 is establishing a connection to the external device, in a implementation, the control circuit 1031 turns off the pull-up switch 1032 and turns on the pull-down switch 1036 within a preset time interval after the pull-up switch 1032 and the pull-down switch 1036 are alternately turned on for several periods, and alternately turns on the pull-up switch 1032 and the pull-down switch 1036 again for several periods after the preset time interval.

It is noted that the signal b in FIG. 7 is used as an example. After alternately turning on the pull-up switch 1032 and the pull-down switch 1036 for two periods, the control circuit 1031 turns off the pull-up switch and turns on the pull-down switch within a time interval t3, so that the CC pin remains at a low level within the time interval t3. Generally, t3 may be 500 ms. After the time interval t3, the pull-up switch 1032 and the pull-down switch 1036 are alternately turned on repeatedly for two periods. The low-level duration in the high- and low-level alternate mode is prolonged, thereby reducing the active level of the CC pin when the terminal 100 is in the phase shown in FIG. 1b, and further reducing the probability that electrochemical corrosion occurs between the CC pin and the other pin in the Type C interface 110-1.

The Type C protocol specifies a duty cycle and a DRP period length of an on-time of the pull-down switch 1036 in the DRP mode. If the low level within the time interval t3 in FIG. 7 is implemented by configuring the CC pin to be in the UFP mode (to be specific, turning on the pull-down switch 1036 and turning off the pull-up switch 1032), a duty cycle of an on-time of the pull-down switch 1036 exceeds the duty cycle, specified in the Type C protocol, of the on-time of the pull-down switch in the DRP mode.

Based on this, in another implementation, the interface chip 110-2 implements the low level within the time interval t3 by turning off the pull-up switch 1032 and the pull-down switch 1036, and the first resistor 115 provides the path for discharging to the ground for the CC pin. When the interface chip 110-2 simultaneously turns off the pull-up switch 1032 and the pull-down switch 1036, the CC pin is not configured to be in the DRP mode. Therefore, using the foregoing implementation does not violate the specification of the Type C protocol. Apparently, in this case, the low level within the time interval t1 may also be implemented by turning off the pull-up switch 1032 and the pull-down switch 1036.

After configuring the CC pin of the Type C interface 110-1 to be in the high- and low-level alternate mode, the interface chip 110-2 may identify the working mode of the CC pin in the Type C interface 201 of the external device 200 by monitoring a change in a voltage of the CC pin in the high- and low-level alternate mode, and then may configure the CC pin of the Type C interface 110-1 to be in a corresponding transmission mode.

For example, the transmission mode configured for the CC pin of the Type C interface 110-1 is the UFP mode when the interface chip 110-2 identifies that the working mode of the CC pin in the Type C interface 201 of the external device 200 is the DFP mode. The transmission mode configured for the CC pin of the Type C interface 110-1 is the DFP mode when the interface chip 110-2 identifies that the working mode of the CC pin in the Type C interface 201 of the external device 200 is the UFP mode. Or when identifying that the working mode of the CC pin in the Type C interface 201 of the external device 200 is the DRP mode, the interface chip 110-2 negotiates with an interface chip of the external device 200 by using the CC pin of the Type C interface 110-1, to determine the transmission mode of the CC pin of the Type C interface 110-1.

Considering that when the terminal 100 is in a phase shown in FIG. 1c in which the terminal 100 is connected to the external device 200, the motion status may change, the display screen may be turned on, and the like, in order not to affect data or electric energy transmission between the terminal 100 and the external device 200, in an implementation, the processor 101 may further obtain a current working mode of the CC pin of the Type C interface 110-1 from the interface chip 110-2. When the current working mode of the CC pin is a transmission mode, stop controlling the interface chip 110-2 to configure the CC pin of the Type C interface 110-1 to be in the low-level mode or the high- and low-level alternate mode.

In specific implementation, the processor 101 may periodically obtain the current working mode of the CC pin of the Type C interface 110-1 from the interface chip 110-2, or may obtain the current working mode of the CC pin after determining that the interface chip 110-2 is controlled to configure the working mode of the CC pin of the Type C interface 110-1, and does not control the interface chip if the CC pin is currently in the transmission mode. Alternatively, when the working mode of the CC pin is the transmission mode, the interface chip 110-2 may refuse to execute the control signal of the processor 101. This can also avoid changing the current transmission mode of the CC pin.

Figures 8, 9:
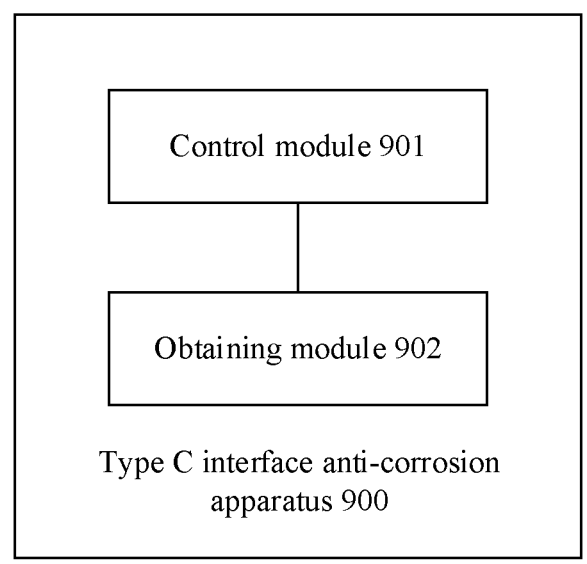
FIG. 8 is a schematic flowchart of a Type C interface anti-corrosion method according to an embodiment of this application.
FIG. 9 is a schematic structural diagram of a Type C interface anti-corrosion apparatus according to an embodiment of this application.

Based on a same technical concept, an embodiment of this application further provides a Type C interface anti-corrosion method. The method may be applied to a processor in a terminal provided in any one of the foregoing embodiments. It is noted that the terminal shown in FIG. 6 is used as an example. FIG. 8 is a schematic flowchart of a Type C interface anti-corrosion method according to an embodiment of this application. As shown in FIG. 8, the method mainly includes the following step:

S801: control, according to a motion status of a terminal 100 that is detected by a motion sensor 106, an interface chip 110-2 to configure a CC pin of a Type C interface 110-1 to be in a low-level mode when it is determined that the motion status of the terminal 100 changes from a moving state to a static state.

Optionally, the method further includes:
obtaining a voltage status of a VBUS pin from the interface chip 110-2, where the voltage status of the VBUS pin is determined by the interface chip 110-2 according to whether a VBUS voltage of the VBUS pin is lower than a preset threshold; and controlling, when it is determined that the motion status of the terminal 100 changes from the moving state to the static state and that the VBUS pin is in a first voltage state in which the VBUS voltage is lower than the preset threshold, the interface chip 110-2 to configure the CC pin of the Type C interface 110-1 to be in the low-level mode.

Optionally, the method further includes:
controlling, when it is determined that the terminal 100 is connected to an external device by using the Type C interface 110-1, the interface chip 110-2 to configure the CC pin of the first Type C interface to be in a high- and low-level alternate mode.

Optionally, the determining that the terminal 100 is connected to an external device by using the Type C interface 110-1 includes:

obtaining a voltage status of a VBUS pin from the interface chip 110-2, where the voltage status of the VBUS pin is determined by the interface chip 110-2 according to whether a VBUS voltage of the VBUS pin is lower than a preset threshold; and controlling, when it is determined that the VBUS pin is in a second voltage state in which the VBUS voltage is not lower than the preset threshold, the interface chip 110-2 to configure the CC pin of the Type C interface 110-1 to be in the high- and low-level alternate mode.

Optionally, the method further includes:

controlling, when it is determined that the motion status of the terminal 100 changes from the static state to the moving state, the interface chip 110-2 to configure the CC pin of the Type C interface 110-1 to be in a high- and low-level alternate mode.

Optionally, the method further includes:

controlling, when it is determined that a display screen of the terminal 100 is turned on, the interface chip 110-2 to configure the CC pin of the Type C interface 110-1 to be in a high- and low-level alternate mode.

Optionally, the interface chip 110-2 is further configured to cache a current working mode of the CC pin; and the method further includes:

obtaining the current working mode of the CC pin from the interface chip 110-2; and stopping, when the current working mode of the CC pin is a transmission mode, controlling the interface chip 110-2 to configure the CC pin to be in the low-level mode or the high- and low-level alternate mode, where the transmission mode is a corresponding working mode configured by the interface chip 110-2 for the CC pin in the Type C interface 110-1 according to a working mode of a CC pin in a Type C interface of the external device.

It should be noted that the Type C interface anti-corrosion method shown in FIG. 8 may be considered as a method performed by the processor 101 in the terminal shown in FIG. 3. For an implementation and technical effects that are not described in detail in the Type C interface anti-corrosion method shown in FIG. 8, refer to related descriptions in the terminal shown in FIG. 3.

Based on a same technical concept, an embodiment of this application further provides a Type C interface anti-corrosion apparatus. The apparatus may run in a processor, such as the processor 101 in FIG. 6. Specifically, the anti-corrosion state may run in the sensor hub of the processor 101, so that the processor 101 performs the Type C interface anti-corrosion method provided in any one of the foregoing embodiments. As shown in FIG. 9, a Type C interface anti-corrosion apparatus 900 includes:

a control module 901, configured to control, according to a motion status of a terminal 100 that is detected by a motion sensor 106, an interface chip 110-2 to configure a CC pin of a Type C interface 110-1 to be in a low-level mode when it is determined that the motion status of the terminal 100 changes from a moving state to a static state.

Optionally, the Type C interface anti-corrosion apparatus 900 further includes an obtaining mode 902, and the obtaining mode 902 is configured to obtain a voltage status of a VBUS pin from the interface chip 110-2, where the voltage status of the VBUS pin is determined by the interface chip 110-2 according to whether a VBUS voltage of the VBUS pin in the Type C interface 110-1 is lower than a preset threshold; and the control module 901 is further configured to control, when it is determined that the motion status of the terminal 100 changes from the moving state to the static state and that the VBUS pin is in a first voltage state in which the VBUS voltage is lower than the preset threshold, the interface chip 110-2 to configure the CC pin of the Type C interface 110-1 to be in the low-level mode.

Optionally, the control module 901 is further configured to control, when it is determined that the terminal is connected to an external device by using the Type C interface 110-1, the interface chip 110-2 to configure the CC pin of the Type C interface 110-1 to be in a high- and low-level alternate mode.

Optionally, the control module 901 is specifically configured to control, when it is determined that the VBUS pin in the Type C interface 110-1 is in a second voltage state in which the VBUS voltage is not lower than the preset threshold, the interface chip 110-2 to configure the CC pin of the Type C interface 110-1 to be in the high- and low-level alternate mode.

Optionally, the control module 901 is further configured to control, when it is determined that the motion status of the terminal 100 changes from the static state to the moving state, the interface chip 110-2 to configure the CC pin of the Type C interface 110-1 to be in a high- and low-level alternate mode.

Optionally, the control module 901 is further configured to control, when it is determined that a display screen of the terminal 100 is turned on, the interface chip 110-2 to configure the CC pin of the Type C interface 110-1 to be in a high- and low-level alternate mode.

Optionally, the interface chip 110-2 is further configured to cache a current working mode of the CC pin; and the obtaining module 902 is further configured to obtain the current working mode of the CC pin from the interface chip 110-2; and the control module 901 is further configured to stop, when the current working mode of the CC pin is a transmission mode, controlling the interface chip 110-2 to configure the CC pin to be in the low-level mode or the high- and low-level alternate mode, where the transmission mode is a corresponding working mode configured by the interface chip 110-2 for the CC pin in the Type C interface 110-1 according to a working mode of a CC pin in a Type C interface of the external device.

It should be noted that the Type C interface anti-corrosion apparatus 900 shown in FIG. 9 may be configured to perform the Type C interface anti-corrosion method shown in FIG. 8. For an implementation not described in detail in the Type C interface anti-corrosion apparatus 900 shown in FIG. 9, refer to related descriptions in the Type C interface anti-corrosion method shown in FIG. 8. Although some preferred embodiments of this application have been described, persons skilled in the art can make changes and modifications to these embodiments once they learn the basic inventive concept. Therefore, the following claims are intended to be construed as to cover the preferred embodiments and all changes and modifications falling within the scope of this application.

Obviously, persons skilled in the art can make various modifications and variations to the embodiments of this application without departing from the spirit and scope of the embodiments of this application. This application is intended to cover these modifications and variations of this application provided that they fall within the scope of protection defined by the following claims and their equivalent technologies.

What is claimed is:

1. A terminal, comprising a processor, an interface chip, a motion sensor, and a first USB interface, wherein
the processor is separately connected to the motion sensor and the interface chip; the interface chip is separately connected to the processor and a configuration channel (CC) pin in the first USB interface;
the motion sensor is configured to monitor a motion status of the terminal; and
the processor is configured to control, according to the motion status of the terminal that is detected by the motion sensor, the interface chip to configure the CC pin of the first USB interface to be in a low-level mode when it is determined that the motion status of the terminal changes from a moving state to a static state,
wherein the interface chip is further connected to a VBUS pin in the first USB interface, and is configured to obtain a VBUS voltage of the VBUS pin and the processor is further configured to:
obtain the voltage status of the VBUS pin from the interface chip, wherein the voltage status of the VBUS pin is determined by the interface chip according to whether a VBUS voltage of the VBUS pin is lower than a preset threshold; and
control, when it is determined that the terminal is connected to an external device by using the first USB interface and that the VBUS pin is in a first voltage state in which the VBUS voltage is not lower than the preset threshold, the interface chip to configure the CC pin of the first USB interface to be in a high- and low-level alternate mode.

2. The terminal according to claim 1, wherein
the processor is further configured to:
control, when it is determined that the motion status of the terminal changes from the moving state to the static state and that the VBUS pin is in a second voltage state in which the VBUS voltage is lower than the preset threshold, the interface chip to configure the CC pin of the first USB interface to be in a low-level mode.

3. The terminal according to claim 1, wherein the processor is further configured to: control, when it is determined that the motion status of the terminal changes from the static state to the moving state, the interface chip to configure the CC pin of the first USB interface to be in the high- and low-level alternate mode.

4. The terminal according to claim 1, wherein the processor is further configured to:
control, when it is determined that a display screen of the terminal is turned on, the interface chip to configure the CC pin of the first USB interface to be in the high- and low-level alternate mode.

5. The terminal according to claim 1, wherein the interface chip is further configured to cache a current working mode of the CC pin; and
the processor is further configured to:
obtain the current working mode of the CC pin from the interface chip; and
when the current working mode of the CC pin is a transmission mode, stop controlling the interface chip to configure the CC pin to be in the low-level mode or the high- and low-level alternate mode, wherein the transmission mode is a corresponding working mode configured by the interface chip for the CC pin according to a working mode of a CC pin in a second USB interface in USB interfaces of an external device.

6. The terminal according to claim 1, wherein the interface chip configures the working mode of the CC pin according to a control signal provided by the processor; and
the interface chip comprises a control circuit, a pull-up power supply, a pull-up switch, a pull-up resistor, a pull-down switch, and a pull-down resistor, wherein
one end of the pull-up resistor is connected to the pull-up power supply, the other end of the pull-up resistor is connected to a first electrode of the pull-up switch, and a second electrode of the pull-up switch is connected to the CC pin;
one end of the pull-down resistor is grounded, the other end of the pull-down resistor is connected to a first electrode of the pull-down switch, and a second electrode of the pull-down switch is connected to the CC pin; and
the control circuit is separately connected to a control electrode of the pull-up switch and that of the pull-down switch, and the control circuit is configured to control on and off of the pull-up switch and the pull-down switch according to a control signal of the processor.

7. The terminal according to claim 6, wherein the control circuit is configured to turn off the pull-up switch and the pull-down switch according to a first control signal.

8. The terminal according to claim 7, wherein the terminal further comprises a first resistor;
one end of the first resistor is connected to the CC pin, and the other end of the first resistor is grounded; and the first resistor is configured to provide a discharge path for the CC pin.

9. The terminal according to claim 6, wherein the control circuit is further configured to: alternately turn on the pull-up switch and the pull-down switch periodically according to a second control signal; keep a first switch and a second switch off within a preset time interval that is after the pull-up switch and the pull-down switch are alternately turned on for several periods; and after the preset time interval, alternately turn on the pull-up switch and the pull-down switch again for several periods, until the first control signal is received or the working mode of the CC pin in the second USB interface is identified.

10. The terminal according to claim 1, wherein the interface chip comprises a power delivery (PD) chip or a CC controller chip.

11. The terminal according to claim 1, wherein the motion sensor comprises an acceleration sensor (G sensor), and/or a gyroscope, and/or a gravity sensor.

12. The terminal according to claim 1, wherein the first USB interface is a USB Type C interface.

13. A interface anti-corrosion method, wherein the method is applied to a processor in a terminal, the terminal further comprises an interface chip, a first USB interface, and a motion sensor, the processor is separately connected to the interface chip and the motion sensor, the interface chip is separately connected to the processor and the first USB interface, and the method comprises:
controlling, according to a motion status of the terminal that is detected by the motion sensor, the interface chip to configure a configuration channel (CC) pin of the first USB interface to be in a low-level mode when it is determined that the motion status of the terminal changes from a moving state to a static state;
obtaining a voltage status of a VBUS pin from the interface chip, wherein the voltage status of the VBUS pin is determined by the interface chip according to whether a VBUS voltage of the VBUS pin is lower than a preset threshold; and controlling, when it is determined that the terminal is connected to an external device by using the first USB interface and that the VBUS pin is in a first voltage state in which a VBUS voltage is not lower than the preset threshold, the interface chip to configure the CC pin of the first USB interface to be in a high- and low-level alternate mode.

14. The method according to claim 13, wherein the method further comprises:

controlling, when it is determined that the motion status of the terminal changes from the moving state to the static state and that the VBUS pin is in a second voltage state in which the VBUS voltage is lower than the preset threshold, the interface chip to configure the CC pin of the first USB interface to be in a low-level mode.

15. The method according to claim 13, wherein the method further comprises:

controlling, when it is determined that the motion status of the terminal changes from the static state to the moving state, the interface chip to configure the CC pin of the first USB interface to be in the high- and low-level alternate mode.

16. The method according to claim 13, wherein the method further comprises:

controlling, when it is determined that a display screen of the terminal is turned on, the interface chip to configure the CC pin of the first USB interface to be in the high- and low-level alternate mode.

17. The method according to claim 13, wherein the interface chip is further configured to cache a current working mode of the CC pin; and the method further comprises:

obtaining the current working mode of the CC pin from the interface chip; and when the current working mode of the CC pin is a transmission mode, stopping controlling the interface chip to configure the CC pin to be in the low-level mode or the high- and low-level alternate mode, wherein the transmission mode is a corresponding working mode configured by the interface chip for the CC pin according to a working mode of a CC pin in a second USB interface of the external device.

18. The method according to claim 13, wherein the first USB interface is a USB Type C interface.

* * * * *

UNITED STATES PATENT AND TRADEMARK OFFICE
CERTIFICATE OF CORRECTION

| | | |
|---|---|---|
| PATENT NO. | : 11,947,481 B2 | Page 1 of 1 |
| APPLICATION NO. | : 17/261961 | |
| DATED | : April 2, 2024 | |
| INVENTOR(S) | : Jianli Chen et al. | |

It is certified that error appears in the above-identified patent and that said Letters Patent is hereby corrected as shown below:

In the Claims

In Column 22, Line 35, in Claim 9, delete "tum" and insert -- turn --.

In Column 22, Line 41, in Claim 9, delete "tum" and insert -- turn --.

Signed and Sealed this
Twenty-second Day of October, 2024

*Katherine Kelly Vidal*

Katherine Kelly Vidal
*Director of the United States Patent and Trademark Office*